United States Patent
Sainani et al.

(10) Patent No.: US 12,011,011 B2
(45) Date of Patent: Jun. 18, 2024

(54) NATURAL CHEESE AND METHOD FOR MAKING NATURAL CHEESE WITH SPECIFIC TEXTURE ATTRIBUTES

(71) Applicant: Sargento Foods Inc., Plymouth, WI (US)

(72) Inventors: Mihir Sainani, Elkhart Lake, WI (US); Kartik Shah, Elkhart Lake, WI (US); Eva-Maria Düsterhöft, Ede (NL); Willem Johannes Marie Engels, Ede (NL)

(73) Assignee: Sargento Cheese Inc., Plymouth, WI (US)

( * ) Notice: Subject to any disclaimer, the term of this patent is extended or adjusted under 35 U.S.C. 154(b) by 71 days.

(21) Appl. No.: 17/385,107

(22) Filed: Jul. 26, 2021

(65) Prior Publication Data

US 2022/0022477 A1     Jan. 27, 2022

Related U.S. Application Data

(60) Provisional application No. 63/056,821, filed on Jul. 27, 2020.

(51) Int. Cl.
| | |
|---|---|
| *A23C 19/09* | (2006.01) |
| *A23C 9/12* | (2006.01) |
| *A23C 9/142* | (2006.01) |
| *A23C 9/15* | (2006.01) |
| *A23C 19/064* | (2006.01) |
| *A23C 19/068* | (2006.01) |

(52) U.S. Cl.
CPC ........ *A23C 19/0921* (2013.01); *A23C 9/1209* (2013.01); *A23C 9/1422* (2013.01); *A23C 9/1516* (2013.01); *A23C 19/064* (2013.01); *A23C 19/068* (2013.01); *A23C 2210/202* (2013.01); *A23C 2210/252* (2013.01); *A23C 2250/10* (2013.01)

(58) Field of Classification Search
CPC ... A23C 9/1516; A23C 19/064; A23C 19/068; A23C 2210/252; A23C 19/052
See application file for complete search history.

(56) References Cited

U.S. PATENT DOCUMENTS

| | | | |
|---|---|---|---|
| 4,959,229 A | 9/1990 | Reddy et al. | |
| 5,356,640 A | 10/1994 | Jameson | |

(Continued)

FOREIGN PATENT DOCUMENTS

| | | |
|---|---|---|
| EP | 0755630 A1 | 1/1997 |
| EP | 1535519 A1 | 6/2005 |

(Continued)

OTHER PUBLICATIONS

Mountain Feed and Farm Supply, "How Do I Choose the Right Milk to Make Cheese With?" Feb. 5, 2015 (online}, retrieved from the internet Jun. 27, 2023, Found on the Internet <url=https://www.mountainfeed.com/blogs/learn/15828369-how-do-i-choose-the-right-milk-to-make-cheese-with> (Year: 2015).*

(Continued)

*Primary Examiner* — Donald R Spamer
*Assistant Examiner* — Jeffrey D Benson
(74) *Attorney, Agent, or Firm* — Boyle Fredrickson, S.C.

(57) ABSTRACT

The invention provides natural cheese and a method for making natural cheese with specific texture attributes.

10 Claims, 6 Drawing Sheets

(56) References Cited

U.S. PATENT DOCUMENTS

| | | |
|---|---|---|
| 5,629,037 A | 5/1997 | Gaffney |
| 6,551,635 B2 | 4/2003 | Nielsen |
| 6,623,781 B2 | 9/2003 | Rizvi et al. |
| 6,649,199 B2 | 11/2003 | Bigret |
| 6,902,749 B1 | 6/2005 | Lortal et al. |
| 6,916,496 B2 | 7/2005 | Koka et al. |
| 7,041,323 B2 | 5/2006 | Andersen |
| 7,157,108 B2 | 1/2007 | Bhaskar et al. |
| 7,947,315 B2 | 5/2011 | Kodera et al. |
| 8,628,810 B2 | 1/2014 | Barbano et al. |
| 8,993,016 B2 | 3/2015 | Washizu et al. |
| 9,144,249 B2 | 9/2015 | Jolly |
| 9,826,751 B2 | 11/2017 | Glenn, III et al. |
| 2004/0052904 A1 | 3/2004 | Antonsson et al. |
| 2004/0151801 A1 | 8/2004 | Sorensen et al. |
| 2007/0059399 A1 | 3/2007 | Wiles et al. |
| 2007/0172546 A1 | 7/2007 | Moran et al. |
| 2007/0254064 A1 | 11/2007 | Smith et al. |
| 2008/0050467 A1 | 2/2008 | Schlothauer et al. |
| 2008/0220123 A1 | 9/2008 | Fatum et al. |
| 2008/0299252 A1 | 12/2008 | Fatum et al. |
| 2009/0081329 A1 | 3/2009 | Van Dijk et al. |
| 2009/0214705 A1 | 8/2009 | Ledon et al. |
| 2009/0291167 A1 | 11/2009 | Mornet et al. |
| 2010/0055240 A1 | 3/2010 | Van Dijk et al. |
| 2010/0092609 A1 | 4/2010 | van Dijk et al. |
| 2011/0104332 A1 | 5/2011 | Remmerswaal et al. |
| 2012/0171327 A1 | 7/2012 | Galpin et al. |
| 2014/0017357 A1* | 1/2014 | Aaltonen ............. A23C 19/052 426/38 |
| 2014/0023749 A1 | 1/2014 | Jimenez et al. |
| 2014/0322423 A1 | 10/2014 | Gandhi et al. |
| 2015/0173396 A1 | 6/2015 | Gardiner et al. |
| 2015/0289532 A1 | 10/2015 | Chiba et al. |
| 2016/0219894 A1 | 8/2016 | El Soda |
| 2017/0347677 A1 | 12/2017 | Garric et al. |
| 2018/0055064 A1 | 3/2018 | McLeod et al. |
| 2018/0249727 A1 | 9/2018 | Nielsen et al. |
| 2019/0261641 A1 | 8/2019 | Arechiga et al. |
| 2020/0022379 A1 | 1/2020 | Arechiga et al. |

FOREIGN PATENT DOCUMENTS

| | | |
|---|---|---|
| EP | 1385387 B1 | 8/2010 |
| EP | 2647293 A1 | 10/2013 |
| GB | 2554905 A | 4/2018 |
| WO | 02/082917 A1 | 10/2002 |
| WO | 2005046344 A2 | 5/2005 |
| WO | 2009150183 A1 | 12/2009 |

OTHER PUBLICATIONS

Samira, "Super Easy Homemade Cream Cheese," Apr. 2, 2020 (online), retrieved Jun. 27, 2023, From the Internet <url=https://www.alphafoodie.com/super-easy-homemade-cream-cheese/> (Year: 2020).*

IDFA, "Definitions," retrieved Jun. 27, 2023 from the Internet. <url=https://www.idfa.org/definition> (Year: 2023).*

Oommen B S et al., "Effect of Homogenization of Cream on Composition, Yield, and Functionality of Cheddar Cheese made from Milk Supplemented with Ultrafiltered Milk", Dairy Science and Technology (Le Lait), EDP Sciences, Paris, FR, vol. 80, No. 1, Jan. 1, 2000 (Jan. 1, 2000), pp. 77-91, XP008024260, ISSN: 0023-7302, DOI: 10.1051/LAIT:2000109—(15) pages.

Ernstrom C.A. et al., "Cheese Base for Processing. A High Yield Product from Whole Milk by Ultrafiltration", Journal of Dairy Science, vol. 63, No. 2, Feb. 1, 1980 (Feb. 1, 1980), pp. 228-234, XP055886363, US ISSN: 0022-0302, DOI: 10.3168/jds.S0022-0302(80)82918-3—(7) pages.

Anonymous, "Abridged List Ordered by Nutrient Content in Household Measure", Jan. 1, 2018 (Jan. 1, 2018), pp. 1-24, XP055889128, Retrieved from the Internet: URL:https://www.nal.usda.gov/sites/www.nal.usda.gov/files/calcium.pdf pretrieved on Feb. 8, 2022]—(3) pages.

Extended European Search Report dated Feb. 22, 2022; Application No./Patent No. 21187908.5-1105—(14) pages.

* cited by examiner

PC Lot A CT5 10 Weeks

Sargento MJ CT5 10 Weeks

Vat 1 CT5 10 Weeks

Vat 2 CT5 10 Weeks

Vat 3 CT5 10 Weeks

Vat 4 CT5 10 Weeks

NATURAL CHEESE AND METHOD FOR MAKING NATURAL CHEESE WITH SPECIFIC TEXTURE ATTRIBUTES

CROSS-REFERENCE TO RELATED APPLICATIONS

The application claims the benefit of Provisional Application No. 63/056,821, filed Jul. 27, 2020, which is hereby incorporated by reference.

FIELD OF THE INVENTION

The invention relates to the field of natural cheese and a method for making natural cheese with specific texture attributes.

BACKGROUND OF THE INVENTION

Typical natural cheeses have well known texture attributes. Processed cheese, such as American cheese, is a food product made from natural cheese with the addition of other ingredients such as emulsifiers, sodium citrate, calcium phosphate, sorbic acid, enzymes, cheese culture, vitamin D3, milk fat, extra salt, saturated vegetable oils, whey and/or artificial food colorings. Processed cheese has several advantages over natural cheese including resistance to oiling offs when heated and a uniform look and physical behavior. Disadvantages include an elevated amount of sodium and artificial ingredients.

SUMMARY OF THE INVENTION

The present invention includes a method for accumulating milk from which to make natural cheese including the steps of adding concentrated acidified skim milk, adding re-blended acidified skim milk, adding cream with greater than 25% milk fat and adding homogenized milk having between 3-18% milk fat.

The present invention includes a method for producing natural cheese with a calcium reduction as compared to a standard natural cheese made without said method including the steps of producing a calcium reduced stream by acidifying milk and by ultrafiltration to concentrate the acidified skim milk, producing a controlled homogenization stream by separating milk to produce cream and to produce homogenized high fat milk, combining the two streams and making natural cheese from the combined streams wherein the natural cheese has a 35-50% calcium reduction as compared to a standard natural cheese made without said method.

The present invention includes a method for producing natural cheese with specific texture attributes including the steps of creating a stream of concentrated acidified milk by adding an acidulant to skim milk to reduce the milk pH and ultrafiltrating the acidified milk, creating a mineral reduced milk stream by re-blending a portion of the concentrate acidified milk with a diluent, creating a stream of cream having greater than 25% milk fat, creating a stream of one of raw milk and skim milk, creating a stream of homogenized milk having between 3-18% milk fat, combining the five streams and making natural cheese from the combined streams.

The present invention includes a natural cheese made from a natural cheese make process with an ingredient statement as that of a Standard of Identity cheese and having the following characteristics: moisture 42-47%, fat 24-35%, FDB 41-61%, salt 1.5-2.7%, pH 5.1-5.45, calcium 350 to 500 mg/100 grams of cheese and lactose <0.02%.

The present invention includes a cheese made from a natural cheese make process with an ingredient statement as that of a Standard of Identity cheese and having the following characteristics: less stringiness, less oiling off, controlled melt behavior, smooth melt, and homogeneous melt.

BRIEF DESCRIPTION OF THE DRAWINGS

Preferred exemplary embodiments of the invention are illustrated in the accompanying drawings in which like reference numerals represent like parts throughout, and in which.

Figure 1:
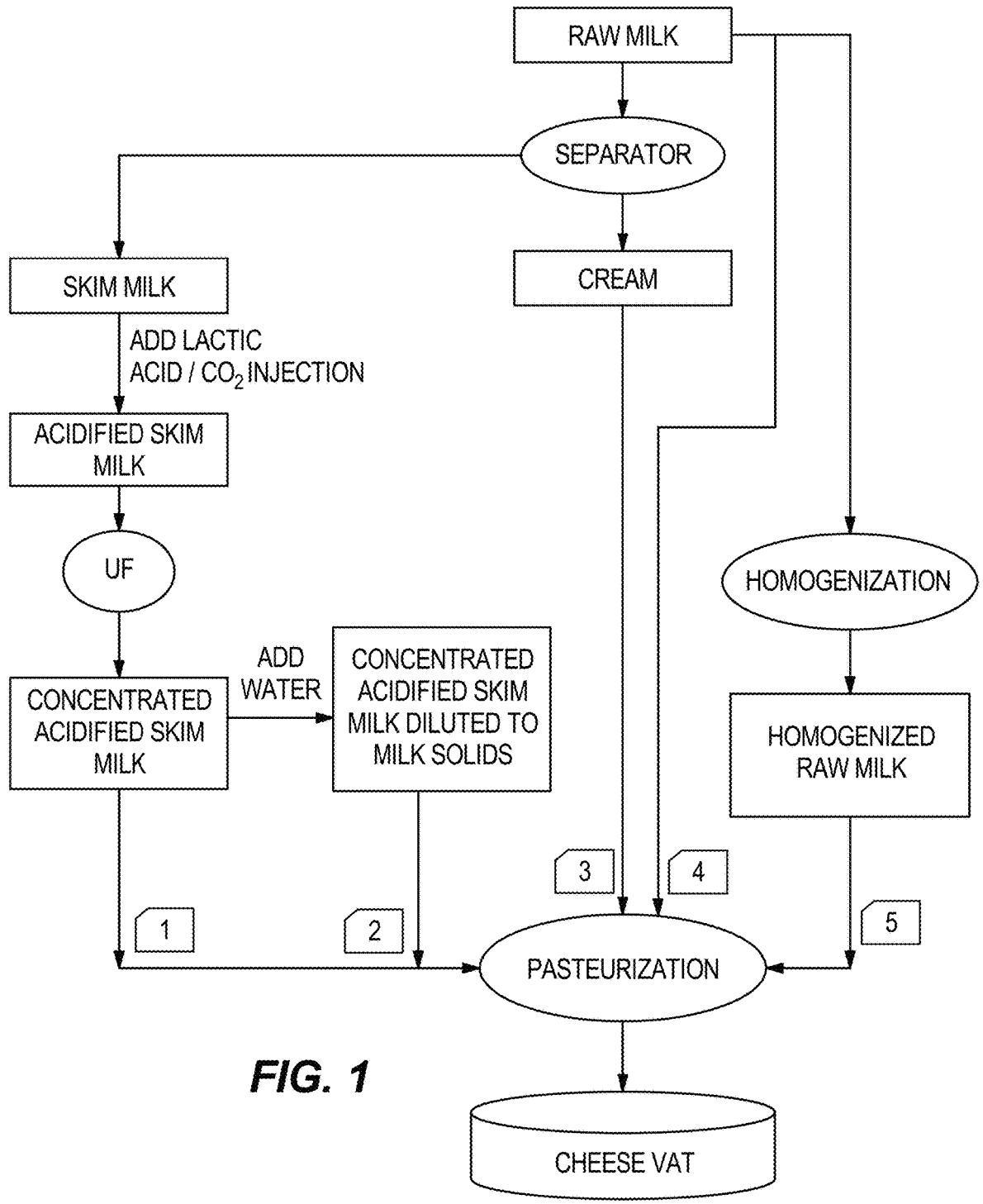
FIG. 1 is a flowchart relating to a cheese make process.

Before any embodiments of the invention are explained in detail, it is to be understood that the invention is not limited in its application to the details of constructions and the arrangement of components set forth in the following description or illustrated in the drawings. The invention is capable of other embodiments and of being practiced or of being carried out in various ways.

DETAILED DESCRIPTION

The invention relates to natural cheese and the production of natural cheese with specific texture attributes. The invention utilizes processes within the boundaries of conventional cheese make technology which allow for the tuning of natural cheese texture while maintaining an ingredient statement as that of a Standard of Identity cheese.

With reference to FIG. 1, an embodiment of one method for making natural cheese with specific texture attributes is shown. The method is divided into split streams relating to calcium reduction for melt behavior for example and relating to controlled homogenization for restricted oiling off for example. As shown in FIG. 1, for example, a total of five streams are produced and recombined, however, other numbers of streams can also be utilized.

In stream 1, raw milk is separated and an acidulant, such as lactic acid, is added to reduce the skim milk pH. Other acidulants, such as using a $CO_2$ injection, can also be utilized. The pH is reduced to between 5.5 and 6.5, more particularly reduced to between 5.7 to 5.9 and, more particularly reduced to 5.9. Following pH adjustment, the acidified skim milk is ultra-filtrated, as is known in the art, to concentrate the acidified skim milk to 3-5-fold, more particularly to 4-5 fold, and more particularly to 4.5.

In stream 2, a portion of the concentrated acidified milk is re-blended with water to produce a mineral reduced milk stream. The resultant stream will have reduced mineral contents such as calcium and phosphorus.

In stream 3, the raw milk is separated to produce cream with greater than 25% milk fat, more particularly in the range of 25-42%, and more particularly 35%.

Stream 4 includes raw milk.

In stream 5, raw milk is standardized to between with between 3-12% milk fat, more particularly to between 3-8% milk fat, and more particularly to 4% milk fat. After the desired milk fat is obtained, the stream is then homogenized, as is known in the art.

In FIG. 1, the streams can be combined in equal or differing percentages to form a unified stream that enters the pasteurization step as will be set forth in more detail below.

Figure 2:
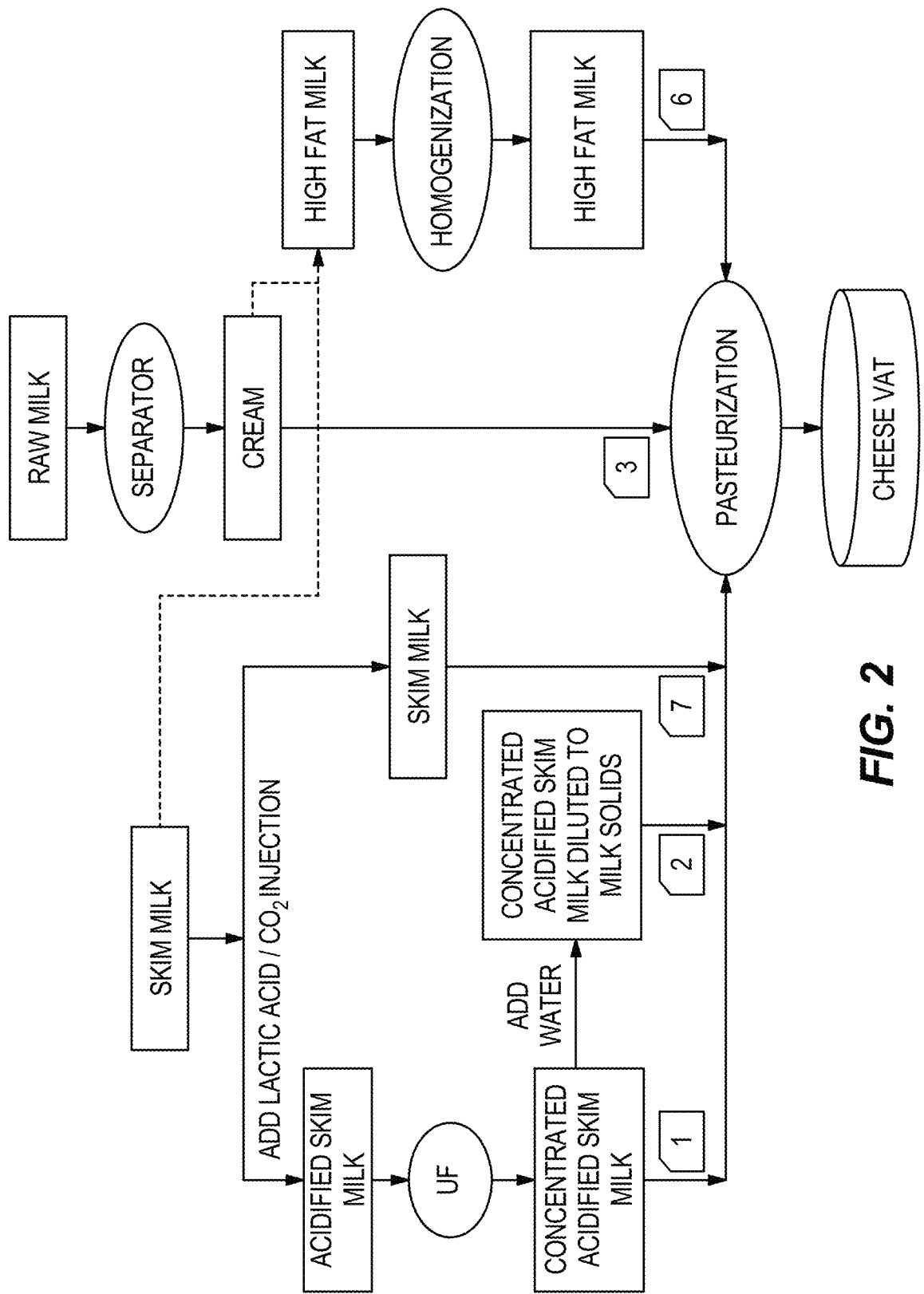
FIG. 2 is a flowchart relating to a second embodiment of a cheese make process.

Turning now to FIG. 2, a second embodiment of a method for making natural cheese with specific texture attributes is shown.

Streams 1, 2 and 3 are the same as described above with respect to FIG. 1. Stream 7 is composed of skim milk. In stream 6, raw milk is standardized to between with between 12-18% milk fat, more particularly to between 13-16% milk fat, and more particularly to 15% milk fat. After the desired milk fat is obtained, the stream is then homogenized, as is known in the art.

The streams can be combined in the same or differing percentages to form a unified stream that enters a pasteurization step. Examples of various percentages for the seven streams described in FIGS. 1 and 2 is as follows:

| Moisture | 42-47% |
|---|---|
| Fat | 24-35% |
| FDB | 41-61% |
| Salt | 1.5-2.7% |
| pH | 5.1-5.45 |
| Calcium | 350 to 550 mg/100 grams of cheese |
| Lactose | <0.02% |

The cheese made according to FIGS. 1 and 2 can also be tuned to add flavors. For example, a flavor can be added by blending a flavor ferment into the curd after salting and prior to pressing.

Examples CT1-CT5. An overview of five different example formulations for making a natural cheese is set forth in Table 1 and Table 2.

TABLE A

Cheese Milk Formulations (data given are parts per 100 m/m)

| | CT5 | | | | CT7 | | | | CT4 | | | | CT3 | | | |
|---|---|---|---|---|---|---|---|---|---|---|---|---|---|---|---|---|
| | V1 | V2 | V3 | V4 | V1 | V2 | V3 | V4 | V1 | V2 | V3 | V4 | V1 | V2 | V3 | V4 |
| Stream 8 | | | | | 0.9 | 0.9 | 0.9 | 0.9 | | | | | | | | |
| Stream 7 | 47.2 | | | 47.2 | | | | | 46.8 | 46.8 | 46.8 | 46.8 | 51.1 | 52.6 | 48.5 | 48.4 |
| Stream 4 | | 19.75 | 19.75 | 0 | 19.2 | 19.2 | 19.2 | 19.2 | | | | | | | | |
| Stream 5 | | 39.7 | 39.7 | 0 | 40.4 | 40.3 | 40.3 | 40.3 | | | | | | | | |
| Stream 2 | 29.75 | 30.1 | 30.1 | 29.75 | 29.8 | 29.8 | 29.8 | 29.8 | 29.6 | 29.6 | 29.6 | 29.6 | 16.7 | 17.2 | 25.8 | 25.8 |
| Stream 1 | 5.3 | 5.2 | 5.2 | 5.3 | 4.9 | 4.9 | 4.9 | 4.9 | 6.00 | 6.00 | 6.00 | 6.00 | 10.6 | 9.2 | 6.3 | 6.3 |
| Stream 3 | 7.05 | 5.25 | 5.25 | 7.05 | 4.8 | 4.9 | 4.9 | 4.9 | 7.00 | 7.00 | 7.00 | 7.00 | 9.7 | 9.45 | 8.6 | 8.6 |
| Stream 6 | 10.7 | 0 | 0 | 10.7 | | | | | 10.6 | 10.6 | 10.6 | 9.2 | 11.8 | 11.5 | 10.8 | 10.8 |
| Stream 10 | 0.76 | 0.76 | 0.76 | 0 | | | | | | | | | | | | |
| Stream 9 | | | | | | | | | | | | 1.4 | | | | |

The total amount demineralized protein prior to milk standardization is preferably in the range of 30-50%, and more particularly in the range of 45-47%, of total proteins in the vat. The total amount of homogenized fat is preferably in the range of 20-40%, and more particularly 35%, prior to milk standardization. The milk concentration factor is preferably approximately 1-1.5, and more particularly 1.15. The target protein:fat ratio in the final milk is preferably around 0.70-0.95, and more preferably 0.77-0.85. Preferably, these are the parameters that determine the ratios of each stream to the vat.

Unacidified skim milk concentrates can also be utilized to satisfy the standardization requirements such as amount of demineralized proteins, protein: fat ratio, and milk concentration factor as can be seen in example CT 7 (stream 8). Lactose powder (Stream 10) is added to compensate the lactose removal as a result of ultrafiltration as well to aid in acid development during the cheesemaking (CT5 V1 to V3). Portion of cream is added with lipolytic enzyme prior to homogenization to generate lipolytic flavor in the final cheese (Stream 9 in CT4 V4).

After pasteurization, the cheese make process proceeds as is known in the art. Additional lactic acid can be added after pasteurization to bring the pH of cheese milk down in the range of 6.1-6.5, and more specifically around 6.2-6.3.

The results of the method shown in FIGS. 1 and 2 include tailored texture attributes including controlled breakdown of the cheese structure and controlled melting and oiling off in particular. Further attributes include reduced stringiness, reduced oiling off, smooth melt, slightly adhesive, mild flavor, creamy, less acidic, and slightly lipolytic.

The natural cheese produced from the method disclosed herein preferably has the following compositional characteristics:

TABLE 1

Cheese Make Parameters

| Cheese | % of fat hom. | % of fat lipase-treat | cf | [% of prot] demin. | Lactic acid bacteria (U/100 L) | Lactobacillus helveticus (U/100 L) | t/T (h/°C.) milk ripening | $CaCl_2$ [g/100 L] | Lactose [g/100 L] | pH at salting | Ripening Temperature (°C.) |
|---|---|---|---|---|---|---|---|---|---|---|---|
| CT1 | | | | | | | | | | | |
| vat 1 | 0 | 0 | 1 | 0 | 10 | 0 | 1.5(32) | 23 | | 5.54 | 6 |
| vat 2 | 0 | 0 | 1 | 0 | 10 | 0 | 1.5(32) | 23 | | 5.65 | 6 |
| vat 3 | 0 | 0 | 1 | 25 | 10 | 0 | 1(32) | | | 5.62 | 6 |
| vat 4 | 20 | 0 | 1 | 25 | 10 | 0 | 1(32) | | | 5.64 | 6 |
| CT2 | | | | | | | | | | | |
| vat 1 | 0 | 0 | 1 | 35 | 10 | 0 | 0.5(32) | | | 5.5 | 6 |
| vat 2 | 0 | 0 | 1.25 | 43 | 10 | 0 | 0.5(32) | | | 5.5 | 6 |
| vat 3 | 35 | 0 | 1 | 35 | 10 | 0 | 0.5(32) | 11.5 | | 5.6 | 6 |
| vat 4 | 35 | 0 | 1.25 | 43 | 10 | 0 | 0.5(32) | | | 5.5 | 6 |
| CT3 | | | | | | | | | | | |
| vat 1 | 35 | 0 | 1.25 | 45 | 10 | 0 | 0.5(32) | | 480 | 5.55 | 6/10 |
| vat 2 | 35 | 0 | 1.25 | 45 | 10 | 2 | 0.5(32) | | 480 | | 6/10 |
| vat 3 | 35 | 0 | 1.15 | 45 | 10 | 0 | 0.5(32) | | 760 | 5.35 | 6 |
| vat 4 | 35 | 0 | 1.15 | 45 | 10 | 0 | 1.5(32) | | 760 | 5.3 | 6 |
| CT4 | | | | | | | | | | | |
| vat 1 | 35 | 0 | 1.15 | 47 | 25 | 2 | 1.0(32) | | 760 | 5.25 | 6 |
| vat 2 | 35 | 0 | 1.15 | 47 | 25 | 2 | 1.0(32) | | 760 | 5.3 | 6/10 |
| vat 2 | 35 | 0 | 1.15 | 47 | 25 | 2 | 1.0(32) | | 760 | 5.3 | 6/10 |
| vat 3 | 35 | 0 | 1.15 | 47 | 25 | 2 | 0.5(32) | | 760 | 5.45 | 6 |
| vat 4 | 35 | 4.6 | 1.15 | 47 | 25 | 2 | 0.5(32) | | 760 | 5.4 | 6 |
| CT 5 | | | | | | | | | | | |
| vat 1 | 35 | 0 | 1.15 | 47 | 25 | 2 | 1.0(32) | | 760 | 5.3 | 6 |
| vat 2 | 15 | 0 | 1.15 | 46 | 25 | 2 | 1.0(32) | | 760 | 5.24 | 6 |
| vat 3 | 35 | 0 | 1.15 | 46 | 25 | 2 | 1.0(32) | | 760 | 5.35 | 6 |
| vat 4 | 35 | 0 | 1.15 | 47 | 25 | 2 | 1.0(32) | | 0 | 5.37 | 6 |

Abbreviations:
hom. = homogenized, cf = concentration factor, demin. = demineralized, t = time, T = temperature

TABLE 2

Cheese Milk Formulations (data given are parts per 100 m/m)

CT1

| | Stream 7 | Stream 2 | Stream 3 | Stream 6 |
|---|---|---|---|---|
| Vat 1 REF | 78.8 | | 21.3 | |
| Vat 2 REF | 78.8 | | 21.3 | |
| Vat 3 25 demin | 53.7 | 25 | 21.3 | |
| Vat 4 25 demin 20 homog. | 53.7 | 25 | 17 | 4.3 |

CT2

| | Stream 7 | Stream 2 | Stream 1 | Stream 3 | Stream 6 |
|---|---|---|---|---|---|
| Vat 1 35 demin | 58.3 | 32.8 | | 8.9 | |
| Vat 2 cf 1.25# 35% demin* | 64.4 | 16.3 | 8.2 | 11.1 | |
| Vat 3 35 denim 35% homog.** | 52.2 | 33.2 | | 5.7 | 8.8 |
| Vat 4 cf 1.25 35 + demin 35% homog | 55.9 | 17.3 | 8.4 | 7.3 | 11.1 |

TABLE 2-continued

Cheese Milk Formulations (data given are parts per 100 m/m)

CT3
formulation per 100 w/w

| | Stream 7 | Stream 2 | Stream 1 | Stream 3 | Stream 6 |
|---|---|---|---|---|---|
| vat 1 cf 1.25 | 51.1 | 16.7 | 10.6 | 9.7 | 11.8 |
| vat 2 cf 1.25 | 52.6 | 17.2 | 9.2 | 9.45 | 1.5 |
| vat 3, cf 1.15 | 48.5 | 25.8 | 6.3 | 8.6 | 10.8 |
| vat 4, 1.15 | 48.4 | 25.8 | 6.3 | 8.6 | 10.8 |

CT4

| | Stream 7 | Stream 2 | Stream 1 | Stream 3 | Stream 6 | Stream 9 |
|---|---|---|---|---|---|---|
| vat 1 cf 1.15 | 46.8 | 29.6 | 6 | 7 | 10.6 | 0 |
| vat 2 cf 1.15 | 46.8 | 29.6 | 6 | 7 | 10.6 | 0 |
| vat 3, cf 1.15 | 46.8 | 29.6 | 6 | 7 | 10.6 | 0 |
| vat 4, cf 1.15 | 46.8 | 29.6 | 6 | 7 | 9.2 | 1.4 |

| CT5 | Stream 7 | Stream 2 | Stream 1 | Stream 3 | Stream 6 | Stream 5 | Stream 4 |
|---|---|---|---|---|---|---|---|
| vat 1 cf 1.15 | 47.2 | 29.75 | 5.3 | 7.05 | 10.7 | | |
| vat 2 cf 1.15 | | 30.1 | 5.2 | 5.25 | | 39.7 | 19.75 |
| vat 3, cf 1.15 | | 30.1 | 5.2 | 5.25 | | 39.7 | 19.75 |
| vat 4, cf 1.15 | 47.2 | 29.75 | 5.3 | 7.05 | 10.7 | | |

The mineral composition of Stream 2 in the examples is given in Table 3. The reduction of calcium and phosphorus achieved by ultrafiltration at pH 5.9 and dilution to starting volume with water is approximately 39% and 46% compared to the starting skim milk.

TABLE 3

Total and serum Ca and P contents [mg/100 g] in skim milk and demineralized split stream UFpH5.9dl in CT1-4. Serum Ca and P is defined as the fraction recovered in the permeate after ultracentrifugation (100,000 × g, 1 h/5° C.).

| | cf | Skim Ca | Skim P | Skim serum Ca | Skim serum P | UFpH5.9 dl Ca | UFpH5.9 dl P | UFpH5.9 dl serum Ca | UFpH5.9 serum P |
|---|---|---|---|---|---|---|---|---|---|
| CT1 | 3 | 134 | 103 | 47.7 | 49.5 | 102 | 71 | 35.4 | 27 |
| CT2 | 4.2 | 141 | 107 | 40.3 | 41.9 | 91.3 | 61.8 | 28.8 | 20.7 |
| CT3 | 4.4 | 128 | 97.9 | 45.2 | 44.9 | 77.7 | 53.4 | 28.9 | 20.5 |
| CT4 | 4.4 | 125 | 98.4 | n.dt. | n.dt. | 74.9 | 52.1 | n.dt. | n.dt. |
| CT5 | 4.4. | 126 | 102 | n.dt. | n.dt. | 77 | 53.5 | n.dt. | n.dt. | n.dt. = not determined
cf = concentration factor, dl = diluted

In Example CT1, the cheese make process was designed to achieve a composition and mimic processing for Monterey Jack type cheese as follows:
- pre-acidification of milk for 1.5 hours at 32° ° C. using mesophilic/thermophilic starter
- adding rennet
- cutting, stirring (10 min, 10 min)
- heating to 39° C. at a rate of approximately 0.3°C/min
- cooking (10 minutes at 39° ° C.)
- draining
- dry stirring
- washing (sprinkling of cold water (15° C.) on acidified curds for cooling, acidification and moisture control)
- dry salting at pH 5.6
- filling in molds
- pressing (0.5 hours at 3 bar, 1 hour at 4 bar)
- vacuum packing
- ripening at 6° C. to 10° ° C.

Processing times for Examples CT1-CT4 are set forth in Table 4.

TABLE 4

Processing Times

| | Pre-ripen time [min] | pH at rennet | Rennet time [min/sec] | Make time [h]* | pH at salt |
|---|---|---|---|---|---|
| CT1 | | | | | |
| REF vat 1 | 90 | 6.61 | 31 | 3 | 5.54 |
| REF vat 2 | 90 | 6.6 | 30 | 3 | 5.65 |
| vat 3 | 60 | 6.52 | 23'30" | 2.75 | 5.54 |
| vat 4 | 60 | 6.59 | 21'50" | 2.75 | 5.64 |
| CT2 | | | | | |
| vat 1 | 30 | 6.45 | 40 | 3.8 | 5.5 |
| vat 2 | 30 | 6.41 | 31'20" | 3.8 | 5.5 |
| vat 3 | 30 | 6.41 | 25'15" | 3.6 | 5.63 |
| vat 4 | 30 | 6.43 | 29'50" | 3.9 | 5.5 |
| CT3 | | | | | |
| vat 1 | 30 | 6.4 | 31'55" | 4 | 5.55 |
| vat 2 | 30 | 6.28 | 19'25" | 4.5 | 5.38 |
| vat 3 | 30 | 6.26 | 20'25" | 4.25 | 5.35 |
| vat 4 | 90 | 6.25 | 22'10" | 4.4 | 5.3 |
| CT4 | | | | | |
| vat 1 | 60 | 6.22 | 19' | 2.8 | 5.22 |
| vat 2 | 65 | 6.2 | 19'15" | 2.9 | 5.3 |
| vat 3 | 35 | 6.25 | 17'45" | 2.8 | 5.4 |
| vat 4 | 30 | 6.24 | 20' | 3 | 5.4 |
| CT5 | | | | | |
| vat 1 | 60 | 6.20 | 19'00" | 3 | 5.3 |
| vat 2 | 60 | 6.21 | 19'00" | 2.8 | 5.24 |
| vat 3 | 60 | 6.22 | 24'00" | 2.9 | 5.35 |
| vat 4 | 60 | 6.24 | 19'00" | 2.7 | 5.37 |

*make time = time from rennet addition to start salting

In the Examples, calcium and phosphorus reduction in cheese is obtained when using at total of 47% of demineralized split stream 1 and 2 to raise the concentration factor of the milk to 1.15, reducing milk pH prior to milk-ripening to pH 6.35 with lactic acid and at a starter dosage of 25 U/100 L. A pre-ripening time of 60 minutes and salting at pH of 5.22 contributed to the effective mineral reduction. In addition to the reduced mineral content in the split stream, the short make time and low pH in the final cheese contributed to additional calcium and phosphorus reduction. See Table 5.

TABLE 5

Composition of Cheeses from CT1-4 Determined after 14 days from Production. Calcium and phosphorus contents are also expressed as Ca, P per 100 g protein.

| | [%] moist. | [%] fat | [%] Protein* | mg/kg Ca | mg/kg P | [%] NaCl | [%] lactose | pH (end) | [%] Ca/prot | [%] P/prot |
|---|---|---|---|---|---|---|---|---|---|---|
| CT1 | | | | | | | | | | |
| vat 1 | 40.9 | 30.5 | 24.6 | 726 | 505 | 1.31 | n.d. | 5.28 | *2.96* | *2.06* |
| vat 2 | 41.2 | 30.5 | 24.0 | 727 | 508 | 1.47 | n.d. | 5.34 | *3.02* | *2.11* |
| vat 3 | 41 | 30.6 | 24.2 | 741 | 511 | 1.45 | n.d | 5.44 | *2.94* | *2.06* |
| vat 4 | 41 | 30.3 | 24.4 | 719 | 503 | 1.53 | n.d | 5.25 | *2.99* | *2.08* |
| CT2 | | | | | | | | | | |
| vat 1 | 40.5 | 29 | 25.7 | 684 | 491 | 2.39 | n.d. | 5.50 | *2.66* | *1.91* |
| vat 2 | 39.3 | 31 | 25.1 | 660 | 476 | 2.12 | n.d. | 5.46 | *2.63* | *1.89* |
| vat 3 | 42.9 | 29.4 | 23.5 | 630 | 449 | 1.82 | n.d. | 5.45 | *2.86* | *1.91* |
| vat 4 | 41.3 | 30.5 | 23.9 | 620 | 446 | 1.78 | n.d | 5.36 | *2.59* | *1.87* |
| CT3 | | | | | | | | | | |
| vat 1 | 39.6 | 30.7 | 25.4 | 624 | 454 | 1.76 | n.d. | 5.34 | *2.45* | *1.78* |
| vat 2 | 38.3 | 32.1 | 25.4 | 583 | 442 | 1.9 | n.d. | 5.34 | *2.30* | *1.74* |
| vat 3 | 38.3 | 31.5 | 25.9 | 581 | 447 | 2.1 | n.d. | 5.40 | *2.24* | *1.73* |
| vat 4 | 39.7 | 31.7 | 24.5 | 537 | 426 | 1.85 | n.d | 5.25 | *2.19* | *1.74* |
| CT4 | | | | | | | | | | |
| vat 1 | 42.8 | 29.5 | 22.9 | 433 | 319 | 2.1 | | 5.15 | *1.89* | *1.39* |
| vat 2 SC | 43.7 | 29.6 | 22.4 | | | 1.77 | | 5.15 | | |
| vat 2 SC | 44.3 | 29.1 | 22.3 | | | 1.87 | | 5.14 | | |
| vat 3 | 42.2 | 30.3 | 22.9 | 490 | 352 | 2 | | 5.26 | *2.14* | *1.54* |
| vat 4 | 40.8 | 31.1 | 23.8 | 515 | 369 | 1.95 | | 5.32 | *2.16* | *1.55* |
| CT5 | | | | | | | | | | |
| vat 1 | 40.7 | 30.8 | 23.7 | 500 | 394 | 2.21 | 0.19 | 5.28 | *2.11* | *1.66* |
| vat 2 | 46.6 | 27.3 | 21.4 | 444 | 349 | 2.12 | n.d | 5.16 | *2.08* | *1.63* |
| vat 3 | 43.6 | 29.1 | 22.6 | 483 | 374 | 2.15 | n.d | 5.29 | *2.14* | *1.66* |
| vat 4 | 42 | 29.8 | 23.1 | 393 | 511 | 2.09 | n.d | 5.30 | *1.70* | *2.21* |

*in italics approximate protein content calculated according to: protein [%] = dry matter [%] − (fat [%] + ash [%] + lactate [%]; n.d. = not detected Cheese firmness is measured instrumentally under cold conditions (refrigerator, shredding/slicing temperature) and melting properties were measured by two empirical tests, modified Schreiber test for melt area and the extent of oiling-off. The data is summarized in Table 6.

correlated with moisture contents. The level of calcium in cheese was not found to be related to firmness. Fracture strain, shortness (=opposite to long/elastic) appeared to be correlated with calcium content of the cheese while pH appeared not to influence the fracture strain.

TABLE 6

Hot Functionality (oiling-off, melt area), as Measured by Modified Schreiber Test, and Texture (cold) as Measured by Uniaxial Compression (Texture Analyzer) of Cheeses from CT1-4 after 8-10 Weeks Ripening. Unless otherwise indicated (*), the cheeses were ripened at 6° C.

| | Thickness oil layer [%] | | [% of initial diameter] | | [kPa] | | [−/−] | |
|---|---|---|---|---|---|---|---|---|
| | oiling off | oil-off stdev | Melt area | stdev | fracture stress | stdev | frac strain | stdev |
| CT1 | | | | | | | | |
| vat 1(REF) | 10.8 | 2.3 | 201.0 | 1.1 | 57.2 | 9.9 | 0.94 | 0.04 |
| vat 2(REF) | 12.8 | 1.6 | 196.2 | 1.8 | 52.7 | 7.6 | 1.04 | 0.06 |
| vat 3 | 12.3 | 2.1 | 177.7 | 2.3 | 70.6 | 12.1 | 1.14 | 0.05 |
| vat 4 | 9.3 | 1.6 | 173.7 | 4.5 | 70.4 | 10.8 | 1.23 | 0.05 |
| CT2 | | | | | | | | |
| vat 1 | 18.3 | 1.6 | 186.0 | 2.6 | 103.7 | 10.1 | 0.83 | 0.07 |
| vat 2 | 15.2 | 0.4 | 186.9 | 5.7 | 111.8 | 11.5 | 0.89 | 0.04 |
| vat 3 | 4.2 | 1.1 | 180.4 | 3.8 | 59.3 | 7.4 | 1.17 | 0.07 |
| vat 4 | 7.4 | 1.4 | 178.1 | 2.5 | 64.5 | 9.2 | 1.06 | 0.09 |
| CT3 | | | | | | | | |
| vat 1 | 9 | 2 | 155.6 | 3.0 | 110.8 | 5.5 | 0.98 | 0.04 |
| vat 2 | 11 | 1 | 169.7 | 3.0 | 130.1 | 13.8 | 1.03 | 0.06 |
| vat 3 | 11 | 2 | 147.0 | 7.5 | 138.6 | 9.0 | 0.90 | 0.07 |
| vat 4 | 10 | 1 | 168.8 | 3.5 | 77.6 | 3.1 | 0.99 | 0.06 |
| vat 1/10* | 10 | 2 | 173.1 | 3.3 | 76.4 | 8.9 | 0.82 | 0.08 |
| vat 2/10* | 11 | 2 | 169.2 | 2.5 | 100.3 | 9.7 | 0.86 | 0.1 |
| CT4 | | | | | | | | |
| vat 1 | 9 | 1 | 178.8 | 6.9 | 41.8 | 10.1 | 0.7 | 0.07 |
| vat 3 | 7 | 2 | 173.9 | 2.3 | 50.4 | 6.9 | 0.84 | 0.07 |
| vat 4 | 14 | 3 | 164.8 | 2.1 | 68.6 | 3.3 | 0.97 | 0.06 |
| CT5 | | | | | | | | |
| V1 | 10.1 | 1.3 | 175 | n.d | n.d | n.d | n.d | n.d |
| V2 | 0.5 | 0.2 | 158 | n.d | n.d | n.d | n.d | n.d |
| V3 | 1.2 | 0.5 | 152 | n.d | n.d | n.d | n.d | n.d |
| V4 | 6.7 | 0.8 | 182 | | | | | |

*Vat 1 and 2, ripened at 10° C.

The calcium content of the in the final cheese influences the hot functionality of the cheese such as melt behavior. Despite higher extent of demineralization, cheeses spread less upon melting than the reference cheeses with normal calcium and phosphate content at near identical moisture content.

Partial homogenization is effective to reduce the extent of oiling-off, compared to the reference cheese and to other variants without homogenized cream. See for example the following and FIG. 6:

Relative Thickness of Oil of CT2 Vat1-4

Figure 6:
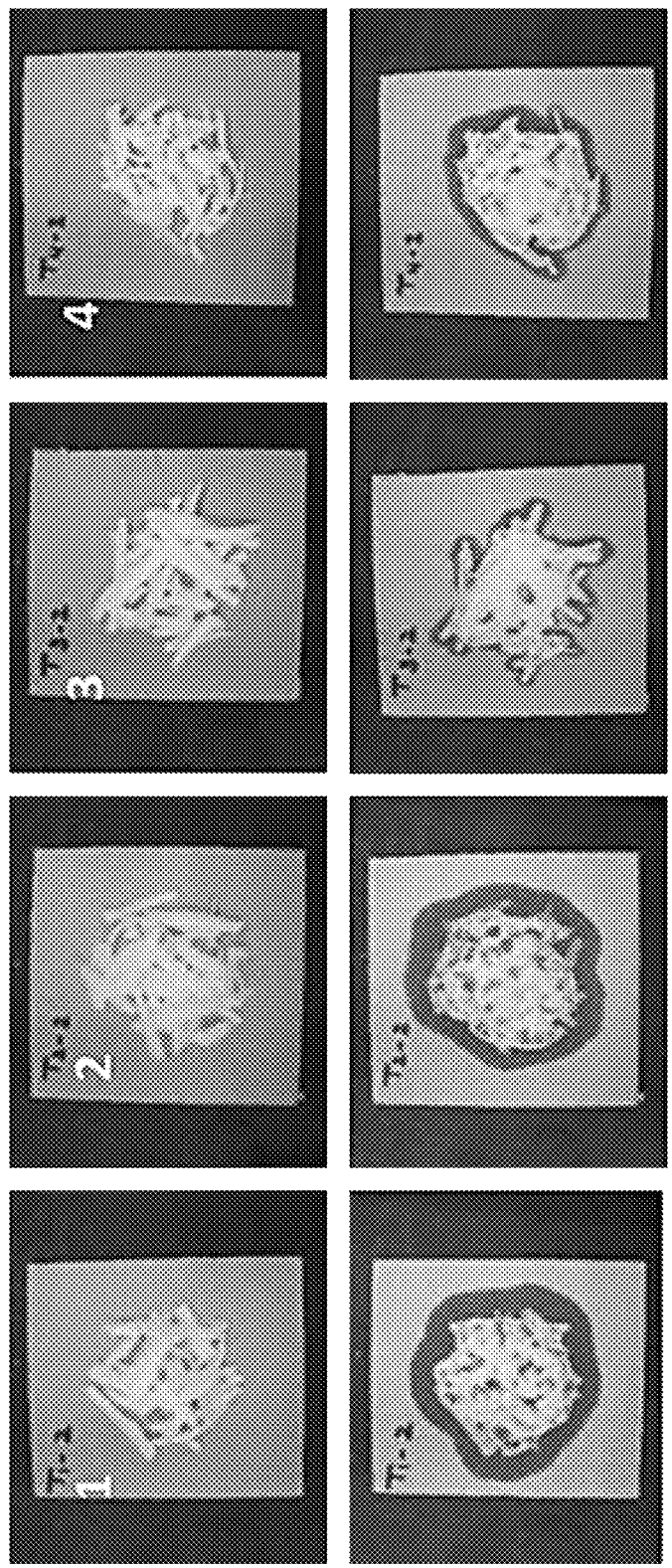
FIG. 6 are photographs of oiling off results.

Oiling-off of cheeses from CT2. Vat 3 and vat 4 had 35% of fat homogenized, vat 1 and vat 2 non-homogenized. In FIG. 6, the upper picture shows shreds before heating, the lower pictures after heating. Oil exudation can be observed as dark zone around the melted cheese.

To assess cold functionality, the firmness (stress at fracture) and shortness (strain at fracture) is measured by uniaxial compression test. Data are given in Table 6. Fracture stress is translated to firmness and fracture strain to shortness. The firmness of the cheeses differed from around 50 kPa to 130 kPa and it appeared to be most strongly With respect to cold functionality, the results of the instrumental compression-fracture measurement are in line with sensory perceived firmness of the cheeses.

With respect to hot functionality, with regard to melt area (modified Schreiber test), the amount of spread is comparable with that the targeted processed cheese counterparts.

Figure 3:
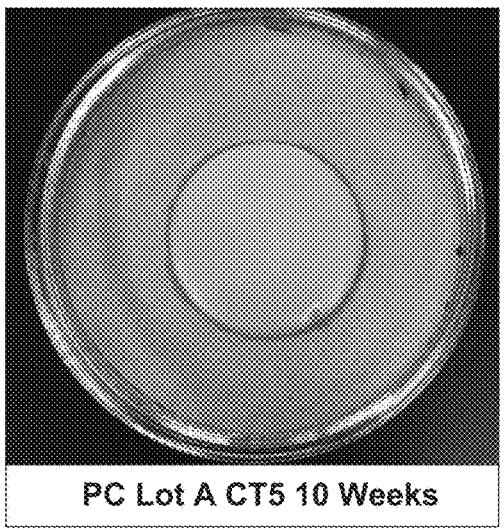
FIG. 3 are photographs showing melting and oiling-off behaviors of cheeses.
Figure 3:
Figure 3:
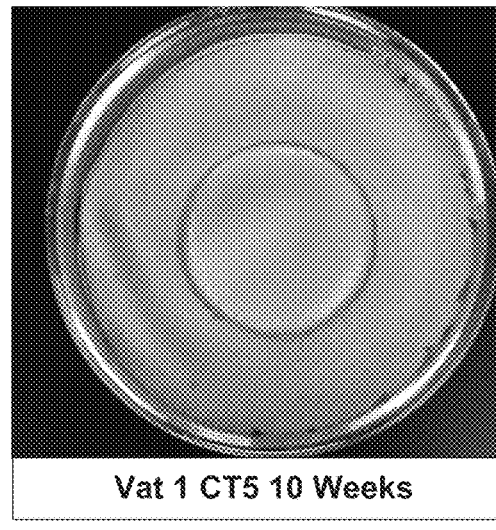
Figure 3:
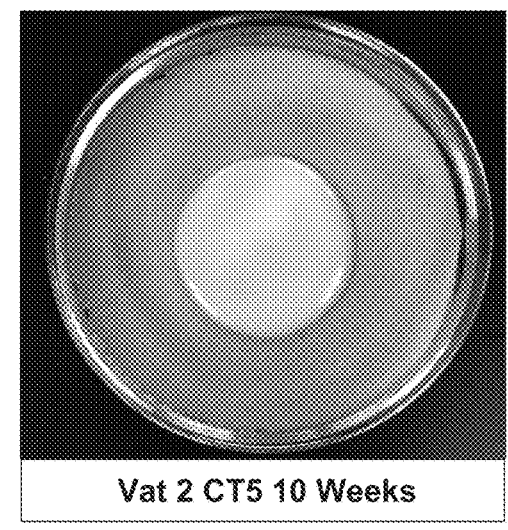
Figure 3:
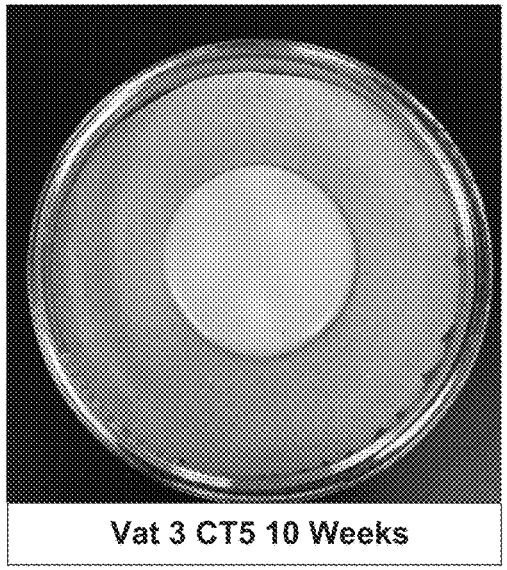
Figure 3:
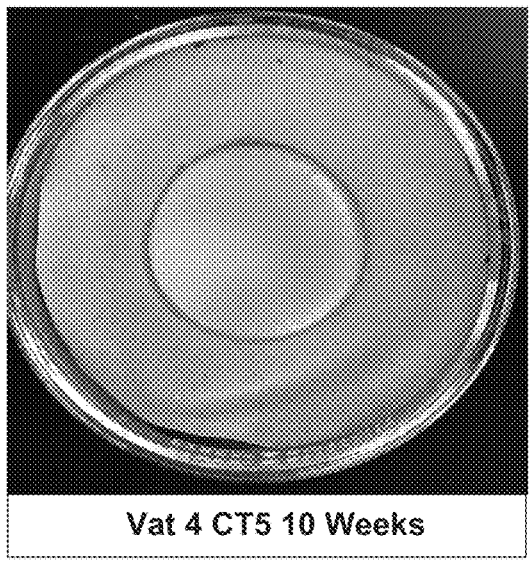

With respect to oiling-off, the effect of emulsion properties is pronounced in the oiling-off behavior as shown in FIG. 3.

In one example, the cheese milk standardized with the various streams according to the one process has the following characteristics: Protein:fat=0.88, protein content=4.16% (i.e., concentration factor 1.15 compared to normal milk with 3.6% protein), lactose content=3.2% (CT5/vat 4), i.e., a dilution by 29% compared to starting milk (4.5% lactose), proportion of demineralized protein (retentate+diluted retentate) is 47% of total protein in the standardized cheese milk, and the proportion of homogenized fat is 35% of total fat in the standardized cheese milk.

The natural cheeses produced had the following approximate composition: moisture content 41-42%, NaCl content 1.8%, fat content 30% and pH −5.30. The calcium and phosphorus content of these cheeses is reduced by approximately 30% and 40% respectively, compared to a reference cheese.

To evaluate the cheese melting properties analytically, temperature sweeps by oscillating small strain rheology were conducted. This methodology relates to the dynamic changes in the ratio between a system's elastic/solid and viscous/liquid behavior (tan δ=G"/G'), as function of temperature. For comparison purpose, a commercially procured sample of Monterey Jack was also evaluated against the cheeses. Parameters used for the evaluations are described in Table 7.

TABLE 7

Parameters to conduct oscillating small strain rheology

| Manufacturer/Model | Anton Parr |
|---|---|
| Temperature Ramp | 5° C.-80° C.-40° C. |
| Temperature Ramp Speed | 2° C./min |
| Frequency | 1 Hz |
| Strain | 0.1% strain |
| Sample Diameter | 25 mm |
| Sample thickness | approx. 2 mm |

The visco-elastic behavior upon heating to 80° ° C. and cooling was markedly different from a standard natural cheese (Monterey Jack), and approached that of processed cheese. As can be seen in Table 8, the Tan $\delta_{max}$ (heat) was highest in the natural cheese sample whereas, the Tan $\delta_{max}$ (heat) was comparatively low for the processed cheese sample. The Tan $\delta_{max}$ (heat) for all the test cheeses ranged from 1.65 to 2.01. CT5 cheeses are less fluid-like and assumingly more cohesive than the natural cheese. The cross-over temperature was found to be typically higher for processed cheeses. The processed cheeses achieved liquid-like properties only at comparatively higher temperature, compared to the natural cheeses. See FIGS. 4 and 5. Cheeses CT5 are closest to the behavior of the processed cheese, notably in the cooling trajectory between 70 and 50° C.

TABLE 8

Parameters deduced from heating-cooling curves

| | T (Crossover) (° C.) Tan δ = 1 (Heat) | Tan δmax (Heat) | T (Crossover) (° C.) Tan δ = 1 (Cool) | Tan δmax (Cool) |
|---|---|---|---|---|
| CT5 Vat 1 | 53.8 | 1.92 | 60.81 | 1.89 |
| CT5 Vat 2 | 55.88 | 1.65 | 60.81 | 1.42 |
| CT5 Vat 3 | 53.85 | 1.71 | 62.91 | 1.62 |
| CT5 Vat 4 | 53.85 | 2.01 | 60.81 | 1.98 |
| Monterey Jack | 53.85 | 2.90 | 58.70 | 2.88 |
| Total Average PC | 66.00 | 1.19 | 65.01 | 1.19 |

Figure 4:
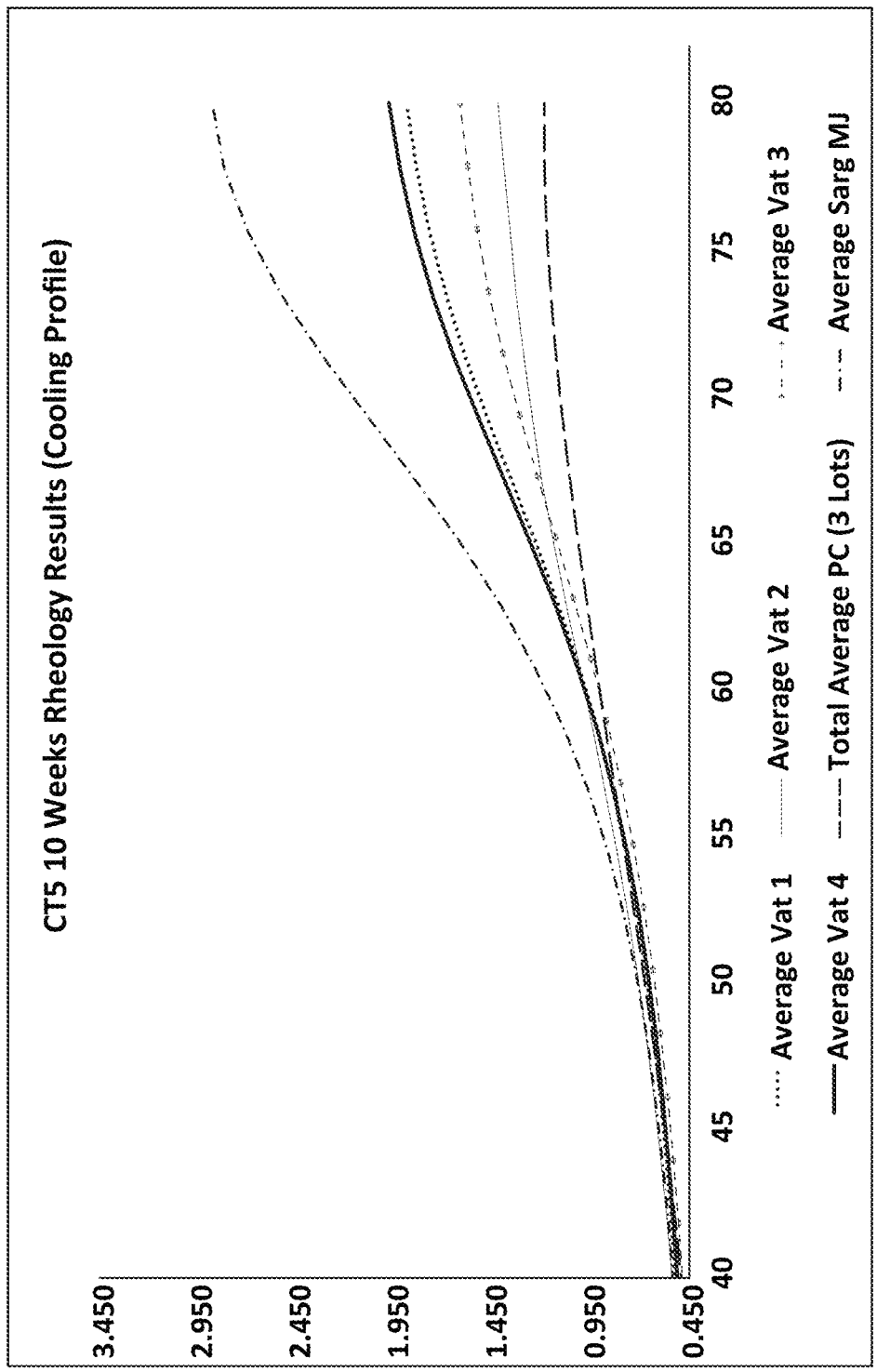
FIG. 4 is a graph of heating rheology data.

With respect to FIG. 4, temperature sweep experiment (from 5-80° C.: Heating) of cheeses CT5 @10 weeks, processed cheese (3 different lots) and Monterey Jack (MJ) @ 10 weeks by small strain oscillating rheology. Tan δ (G"/G') is given as function of temperature (avg of n=3 for CT5 samples, average of 3 lots n=9 for processed cheese, average of n=3 for Monterey Jack.

Figure 5:
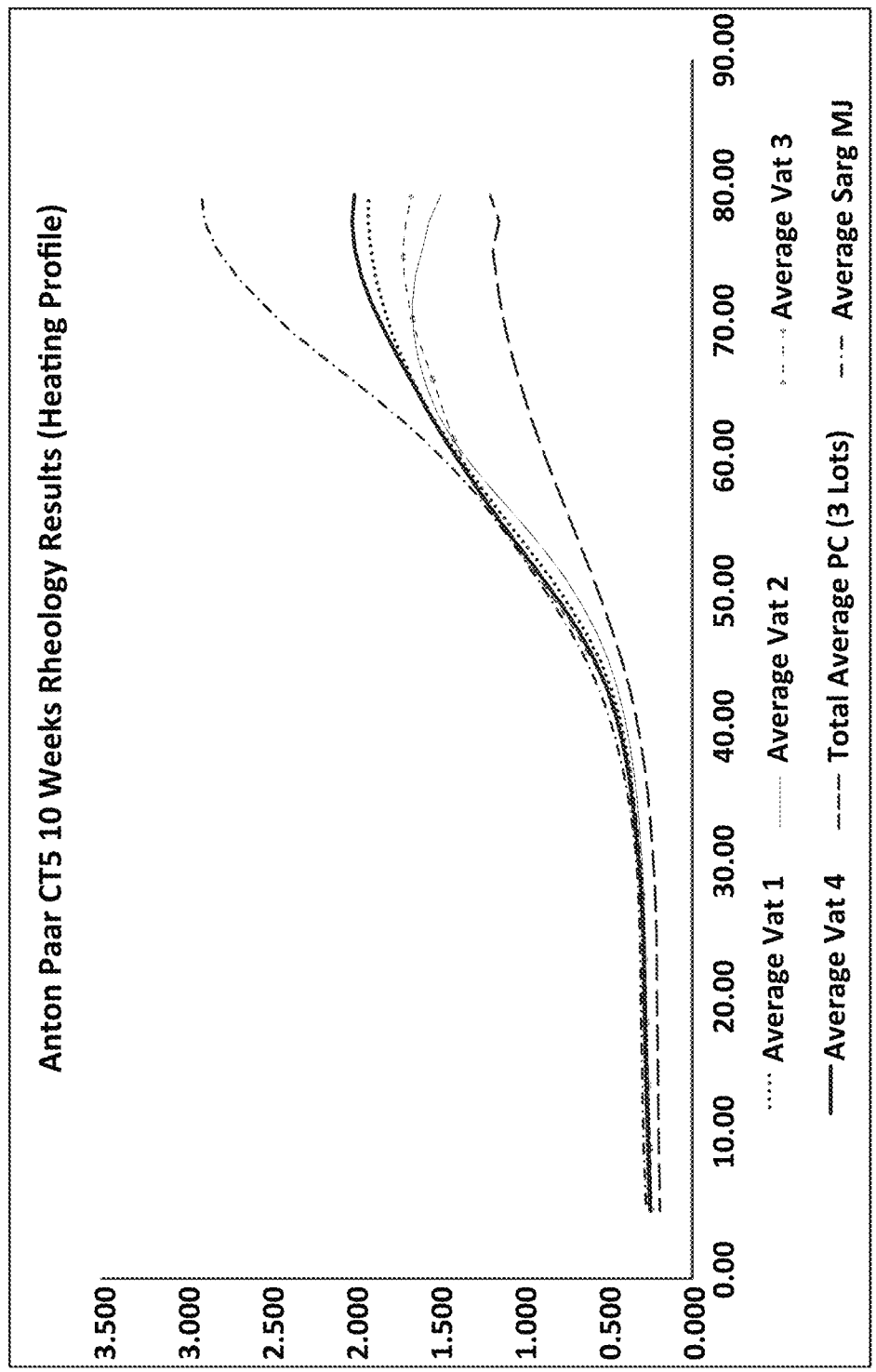
FIG. 5 is a graph of cooling rheology data.

With respect to FIG. 5, temperature sweep experiment (from 80-40° C.: Cooling) of cheeses CT5 @10 weeks, processed cheese (3 different lots) and Monterey Jack (MJ) @ 10 weeks by small strain oscillating rheology. Tan δ (G"/G') is given as function of temperature (avg of n=3 for CT5 samples, average of 3 lots n=9 for processed cheese, average of n=3 for Monterey Jack). The box indicates the temperature range during cooling which is relevant from consumption point of view.

The rheological analysis indicates differences in molecular assembly of the fat-filled protein matrix of the processed cheese and that of the texture-tuned cheeses of CT6. The processed cheese attains fluid-like character at higher temperatures (T crossover heating 12° ° C. higher) and maximum Tan δ remains approx. 35% lower (indicating a higher cohesivity).

The cheeses produced meets the desired chemical composition. Firmness and specific melting properties (e.g., oiling-off, spread, low/no stringiness, homogeneous melt) resembles those of the processed cheese benchmarks.

Various features and advantages of the invention are set forth in the following claims.

We claim:

1. A method for accumulating milk from which to make natural cheese with a specific texture, said method including the steps:
   creating a first stream of concentrated acidified skim milk;
   creating a second stream of re-blended acidified skim milk;
   creating a third stream of cream with greater than 25% milk fat;
   creating a fourth stream of homogenized milk having between 3-18% milk fat; and
   combining the milk in the four streams to produce an accumulated milk source from which to make the natural cheese with the specific texture.

2. The method of claim 1 and further including the step of adding a fifth stream of one of skim milk and raw milk.

3. The method of claim 1 wherein the concentrated acidified milk has a pH in the range of 5.5-6.0.

4. The method of claim 1 wherein the homogenized milk has between 3-12% milk fat.

5. The method of claim 1 wherein the homogenized milk has between 12-18% milk fat.

6. The method of claim 1 wherein the re-blended acidified skim milk includes water.

7. The method of claim 4 and further including a step of adding a fifth stream of raw milk and wherein the concentrated acidified skim milk is approximately 4-11% of the accumulated milk, the re-blended acidified skim milk is approximately 15-30% of the accumulated milk, the cream is approximately 4-11% of the accumulated milk, the homogenized milk is approximately 35-42% of the accumulated milk and the raw milk is approximately 15-20% of the accumulated milk.

8. The method of claim 5 and further including a step of adding a fifth stream of skim milk and wherein the concentrated acidified skim milk is approximately 4-11% of the accumulated milk, the re-blended acidified skim milk is approximately 15-30% of the accumulated milk, the cream is approximately 4-11% of the accumulated milk, the homogenized milk is approximately 8-11% of the accumulated milk and the skim milk is approximately 45-60% of the accumulated milk.

9. A method for producing natural cheese with specific texture attributes, said method including the steps:
   creating a first stream of concentrated acidified milk by adding an acidulant to skim milk to reduce the milk pH and ultrafiltrating the acidified milk;
   creating a second stream of mineral reduced milk stream by re-blending a portion of the concentrate acidified milk with a diluent;

creating a third stream of cream having greater than 25% milk fat;

creating a fourth stream of one of raw milk and skim milk;

creating a fifth stream of homogenized milk having between 3-18% milk fat;

combining the five streams to produce an accumulated milk source; and making the natural cheese from the accumulated milk source.

10. The method of claim 9 and further adding a flavor ferment.

* * * * *